F. M. BASHELIER.
DUMPING TRUCK.
APPLICATION FILED AUG. 27, 1910.
1,145,740.
Patented July 6, 1915.
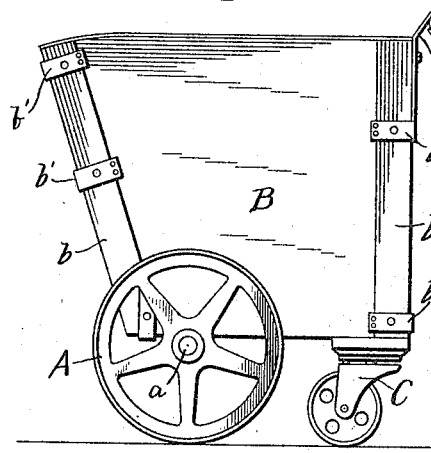
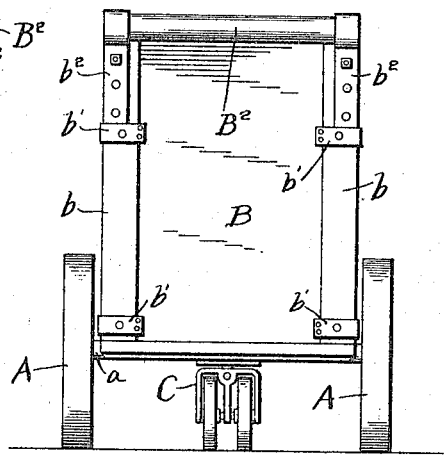
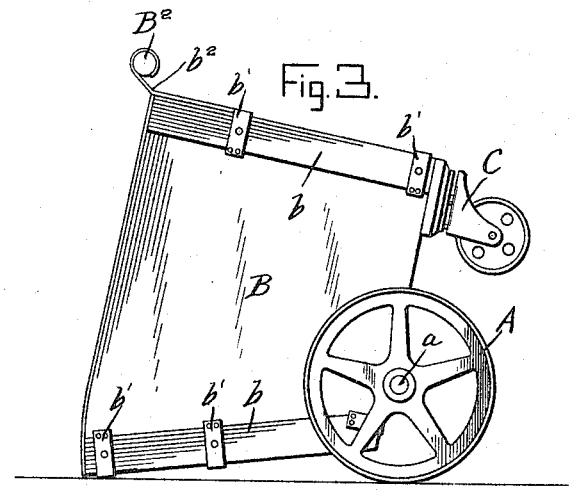

UNITED STATES PATENT OFFICE.

FRANK M. BASHELIER, OF JENKINTOWN, PENNSYLVANIA, ASSIGNOR TO KEYSTONE TYPE FOUNDRY, OF PHILADELPHIA, PENNSYLVANIA, A CORPORATION OF PENNSYLVANIA.

DUMPING-TRUCK.

1,145,740.  Specification of Letters Patent.  Patented July 6, 1915.

Application filed August 27, 1910. Serial No. 579,223.

*To all whom it may concern:*

Be it known that I, FRANK M. BASHELIER, a citizen of the United States, residing at Jenkintown, in the county of Montgomery and State of Pennsylvania, have invented certain new and useful Improvements in Dumping-Trucks, of which the following is a specification.

My said invention consists in certain improvements in the details of construction of dumping trucks especially designed for use in printing offices, to haul printers' "pigs", and "dead slugs", and other such metal, from the composing room to the melting room, the object being to provide such a truck which may be turned in substantially the same space required for it to stand, operated conveniently and dumped with practically no effort and when in use will stand level and firmly upon supporting trucks, all as will be hereinafter more fully described and claimed.

Referring to the accompanying drawings which are made a part hereof and on which similar reference characters indicate similar parts, Figure 1 is a side elevation of a truck embodying my said invention, Fig. 2 a rear elevation of the same, and Fig. 3 a side elevation showing the truck in dumping position.

In said drawings the portions marked A represent the main wheels of the truck, B the body, and C the caster under the rear edge. The main truck consists of the wheels A mounted on each end of the axle $a$, said axle and wheels serving as the main support for the body and the pivot on which it turns for dumping purposes and swivels in turning. The body B consists of two sides, two ends, and a bottom, which may be of iron, or any material found suitable and preferably lined with galvanized iron. Its shape is clearly shown in Figs. 1 and 3. When the truck is in position for loading, its bottom stands in a horizontal position, its rear end is vertical and at right angles with the bottom, while its front end extends outwardly at an angle from the bottom toward the top, the upper portions of the sides of the body being wider from front to rear than their lower portions. The top is parallel with the bottom except at its front which curves downwardly for a distance back from the front edge so that its extreme front edge is lower than the main portion of the sides. The corners of said body are preferably reinforced by angle irons $b$ the flanges of which extend each way from each corner and said corners are further secured by angle braces $b'$ riveted to the sides of said body around said corners, as shown. Said body is mounted upon the axle A by means of suitable bearings on the bottom of said body with which said axle engages and is positioned on said axle so that its front end will normally nearly balance its rear end, enabling the rear end to be tilted up and dumped over the axle A with but little effort. A handle $B^2$ is mounted in brackets $b^2$ riveted to each side of the rear end of the body, said brackets being bent rearwardly from said body, slightly, as best shown in Figs. 1 and 3, in order to throw said handle out from the body sufficiently to enable it to be used conveniently for pushing and dumping the truck.

The rear caster C is mounted in the center of the body under its rear side and serves to support that portion of the weight of the truck and its load in the rear of the axle which overbalances the weight in front of the axle, when the truck is in its normal position. Said caster C being swiveled, or of the ordinary caster form of construction, enables the truck proper to be turned as a whole upon the wheels A in any space of sufficient width to admit the truck.

In use, the truck is wheeled to the correcting cases, or other parts of the composing room where old metal is located, and said metal is thrown into the truck until it is filled, or the available metal is collected. It is then pushed to the point desired to dump it, when the operator, by lifting upon the handle $B^2$ sufficiently to overbalance the excess weight in the rear of the axle A, serves to tilt the body forward over said axle into the position shown in Fig. 3, when the contents will fall out and slide down upon the inclined front side of said body, the truck being pulled back sufficiently to allow all of the material to slide down the incline, as will be readily understood.

The front end of the body being lower than the main side portions thereof, the metal slides out more freely, the front side being thus farther back from the point of deposit when the truck is dumped, thus serving to deposit a larger quantity of the material at the first tipping over of the truck than would otherwise be the case and leaving less upon the front, enabling the truck to be pulled back and freed therefrom more easily.

Having thus fully described my said invention, what I claim as new and desire to secure by Letters Patent, is:

A dumping truck comprising a main axle and wheels, a body mainly supported on said axle with a major portion of its length in the rear, and a short portion in front of said axle whereby its rear portion overbalances its front portion, said front portion extending in front of said axle a distance less than the height of the axle above the tread of the wheels, the body of said truck being formed of four sides and a bottom rigidly secured together and reinforced at the corners, and with an open top extending from the rear to the front side thereof, said front side being inclined forward slightly and with its upper edge in a plane below the mean level of the top of the body with the sides near said front edge tapered from said mean level downwardly to said front edge, forming a body adapted to be filled with material to its top, but with a cut down front adapted when in dumped position to be somewhat behind the top edges of the truck and thus back of the main weight and bulk of the dumped load, a swivel caster mounted under the rear end of said body, and a handle secured to the rear of said body for operating the same, substantially as set forth.

In witness whereof, I have hereunto set my hand and seal at Washington, District of Columbia this 20th day of August, A. D. nineteen hundred and ten.

FRANK M. BASHELIER. [L. S.]

Witnesses:
E. W. BRADFORD,
J. D. YOAKLEY.

Copies of this patent may be obtained for five cents each, by addressing the "Commissioner of Patents, Washington, D. C."